United States Patent

Lidgard et al.

[11] Patent Number: 5,627,921
[45] Date of Patent: May 6, 1997

[54] OPTICAL FIBER FOR SENSORS INCLUDING HOLES IN CLADDING

[75] Inventors: Anne I. B. Lidgard, Stockholm; Leif G. Stensland; K. A. Mikael Åberg, both of Jäfälla, all of Sweden

[73] Assignee: Telefonaktiebolaget LM Ericsson, Stockholm, Sweden

[21] Appl. No.: 323,039

[22] Filed: Oct. 14, 1994

[30] Foreign Application Priority Data

Oct. 14, 1993 [SE] Sweden ................... 9303391

[51] Int. Cl.⁶ ..................................... G02B 6/00
[52] U.S. Cl. ...................... 385/12; 385/125; 385/13; 65/385; 250/227.14
[58] Field of Search ........................ 385/125–128, 385/12, 13; 250/227.13, 227.14, 227.15, 227.16, 227.25, 227.17, 227.18; 356/73.1, 361; 65/385

[56] References Cited

U.S. PATENT DOCUMENTS

| 4,201,446 | 5/1980 | Geddes et al. ............ 385/125 |
| 4,373,768 | 2/1983 | Clarke ..................... 385/145 |
| 4,386,269 | 5/1983 | Murphy .................. 250/227.25 |
| 4,407,668 | 10/1983 | Aulich et al. ................ 65/412 |
| 4,634,856 | 1/1987 | Kirkham ................ 250/227.25 |
| 4,666,235 | 5/1987 | Pavlath ..................... 385/11 |
| 4,714,829 | 12/1987 | Hartog et al. ............ 250/227.14 |
| 4,761,073 | 8/1988 | Meltz et al. ................ 356/32 |
| 4,795,232 | 1/1989 | Persson ..................... 385/13 |
| 5,009,107 | 4/1991 | Grasdepot .................. 73/705 |
| 5,064,270 | 11/1991 | Turpin et al. ................ 385/13 |
| 5,231,681 | 7/1993 | Bergqvist .................. 385/13 |
| 5,251,274 | 10/1993 | Carlström et al. ............. 385/13 |

FOREIGN PATENT DOCUMENTS

| 2183026 | 5/1987 | United Kingdom . |
| 2189900 | 11/1987 | United Kingdom . |
| 2192289 | 1/1988 | United Kingdom . |
| WO87/07255 | 12/1987 | WIPO . |

*Primary Examiner*—Rodney B. Bovernick
*Assistant Examiner*—Hemang Sanghavi
*Attorney, Agent, or Firm*—Burns, Doane, Swecker & Mathis, L.L.P.

[57] ABSTRACT

An optical fiber intended to be used as a sensor is of the kind suitable for communication and has a longitudinal cavity or hole which can be intentionally closed or has a more narrow shape at definite positions in the longitudinal direction of the fiber. The cavity, the diameter of which can be of the magnitude of order of 5 μm–50 μm, is filled with a material changing its volume depending on physical quantities in the fiber environment. The hole can be closed or made narrower at different positions in the longitudinal direction of the fiber for instance by locally heating the fiber by a pulsed laser beam.

21 Claims, 2 Drawing Sheets

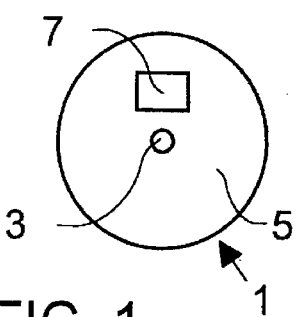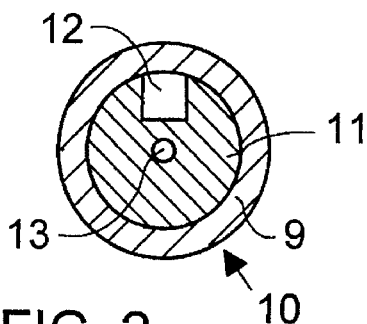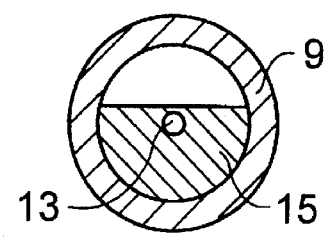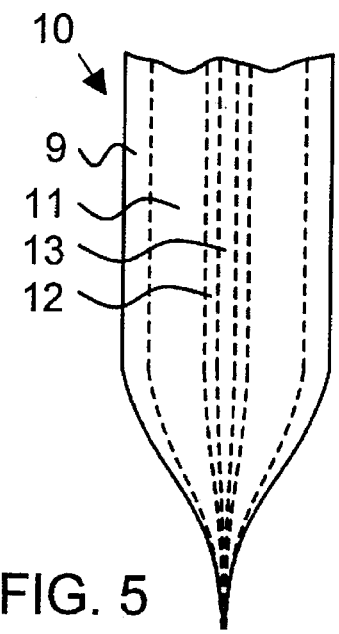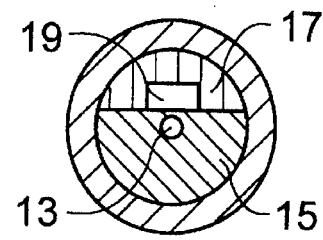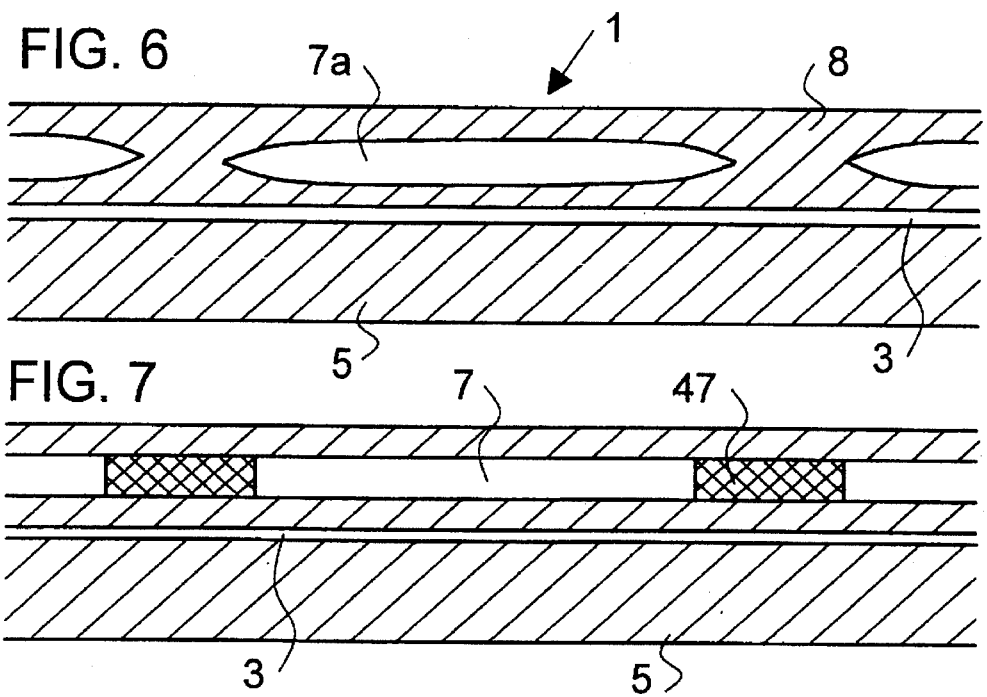

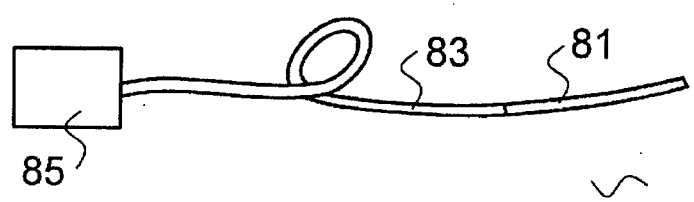
FIG. 8
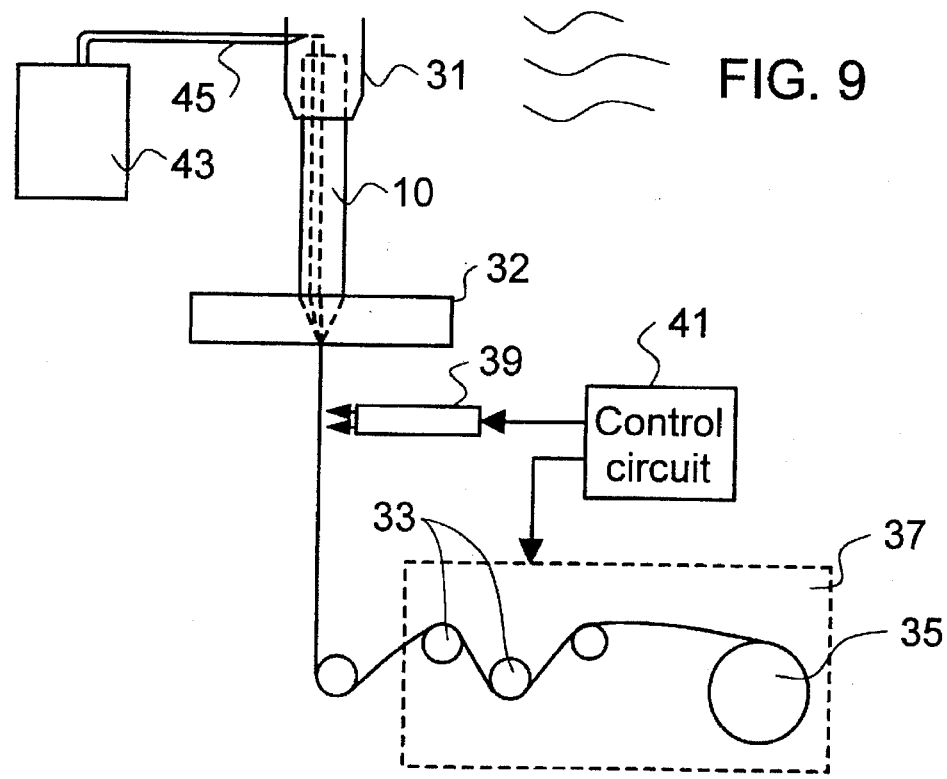
FIG. 9
FIG. 10
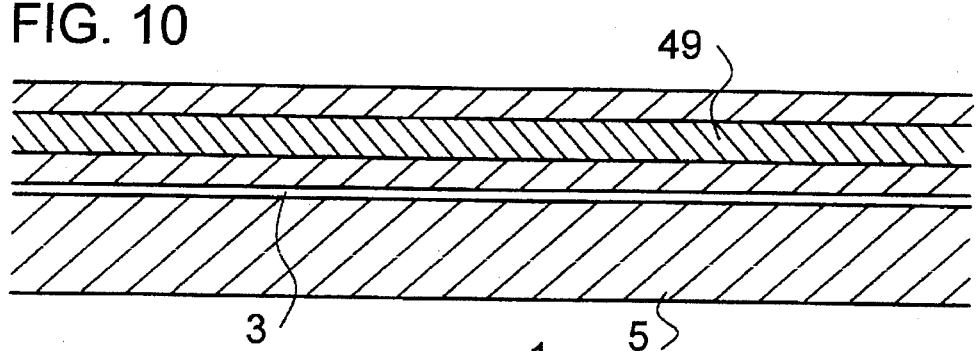
FIG. 11
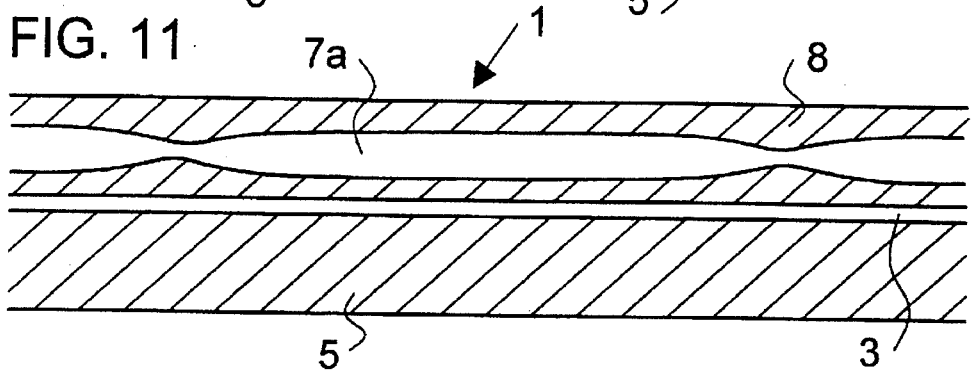

OPTICAL FIBER FOR SENSORS INCLUDING HOLES IN CLADDING

TECHNICAL FIELD

The present invention relates to an optical fiber, which is intended to be used particularly in sensors of various kinds and also to a method for preparing such an optical fiber.

BACKGROUND OF THE INVENTION

Optical fibers are in many cases suited to be used as signal sensors for various physical parameters. Advantages of an optical fiber are generally the insensitivity thereof to exterior electric and magnetic interference and further, that one part of the optical fiber can be used as a signal conductor directly without requiring any galvanic connection by means of electric conductors between the sensed point and a control or monitoring device, receiving the signal generated by the sensor for further processing.

PRIOR ART

Fiber cables for detecting various parameters can make use of microbending of an optical fiber, the fiber being of the ordinary kind intended for communication, the bending in some way being accomplished by an exterior device. The exterior device can be a twisted filament or band, see Swedish patent application No. 8403811-6 corresponding to the U.S. Pat. No. 4,795,232, a wax body located adjacent to the optical fiber, see Swedish patent 8903229-6, or a fiber enclosure made of a polymer having a suitably chosen coefficient of thermal expansion, see Swedish patent 9101237-7. All these cited patents are assigned to the same assignee as the present application. The microbending of the fiber cable can be detected by an OTDR system.

Fibers having a liquid core have been suggested as sensors, see the U.S. Pat. Nos. 4,201,446, 4,714,829 and 4,373,768.

Further, from the British patent application GB-A 2 189 900 an optical fiber is previously known which is provided with longitudinal cavities in the cladding. The cavity or cavities are located so that an optical interaction region is obtained. The thickness of the cladding material located between the cavity and the core is typically less than the core diameter. The fiber is prepared by surrounding inner, suitably shaped preforms provided with the primary substance for forming the core with a tubular preform and by drawing the assembly thus composed in the usual way in a drawing machine for optical fibers. By a suitable filling of the fiber cavity or the fiber cavities a polarizer can be obtained and by rotating the fiber at the manufacture thereof and by filling the cavity or cavities with a suitable substance an optical attenuator can be obtained. With another suitable filling material a component can be obtained for use in an optical amplifier.

Optical fibers having interaction regions in the shape of metal strings located in the cladding of the fiber and extending in parallel to the fiber core are disclosed in the International patent application WO-A1 87/07255. The fibers are prepared by drawing a preform assembly formed by interior cylindrical rod shaped elements, the central element containing the core region and two of the surrounding elements containing metal cores. Around the cylindrical elements a cylindrical exterior enclosing shell is provided.

SUMMARY OF THE INVENTION

It is a purpose of the invention to provide an optical fiber which is suitable for use as a sensor in various contexts or as a component in optical sensors and other optical devices and which does not require any additional exterior means or substances to be attached to the exterior surface of the fiber or wound around the fiber.

It is another purpose of the invention to provide a method for preparing such an optical fiber suited for use as a sensor.

These purposes are achieve by the invention, the more detailed features and characteristics of which appear from the appended claims.

An optical fiber is provided with a longitudinal cavity, located close to or at some distance from the core of the optical fiber or even close to the exterior surface of the fiber. For use as a sensor the longitudinal cavity is in one embodiment deliberately made more narrow or even closed at several, for instance periodically located, places as seen in the longitudinal direction of the fiber. In the through-hole or the individual cavities formed by the closed places a suitable substance may be provided such as a gas, e.g. air, a liquid or possibly a metal.

The longitudinal cavity must have a sufficiently large cross section or have an other suitable shape so that, at exterior influence such as variations of temperature or of pressure in the region surrounding the fiber, microbending can take place in the regions adjacent to these closed places. The longitudinal cavity has advantageously a significant cross section area having a diameter or a largest measure in the cross section of the magnitude of order 0.1–0.9 of the radius of the cladding. The word "diameter" used in connection with a fiber and in particular in connection with the longitudinal hole and various portions of the hole here signify the largest dimensional measure in a cross direction or in a cross section of the fiber or of the hole.

In another embodiment the longitudinal hole is filled with a solid or semisolid material having a large swelling effect at a suitable temperature or within a limited temperature region. At the swelling the fiber will be deformed and thus obtain mechanical stress concentrations.

Thus an optical fiber, in particular for use as a sensor, comprises an essentially circular-cylindrical core which extends in the longitudinal direction of the fiber and is centrally located therein. A cladding surrounds the core and is connected thereto and has an essentially circular-cylindric exterior surface and further, there is a hole in the cladding, the hole extending in the longitudinal direction of the fiber. The longitudinal hole is completely or partly filled with a substance which changes its volume at variations of physical parameters or quantities characteristic of the surrounding region of the fiber. The longitudinal hole can be closed at several separate places in the longitudinal direction of the fiber. The spacing of the closed places in the longitudinal hole can then correspond to at least a few fiber diameters and preferably be at least 0.5 mm and further the closed places for the longitudinal hole can be essentially periodically located in the longitudinal direction of the fiber.

According to a second aspect an optical fiber, in particular for use as a sensor, as in the first aspect, comprises a circular-cylindrical core which extends in the longitudinal direction of the fiber and is centrally located therein. A cladding surrounds and is connected to the core and has an essentially circular-cylindric exterior surface and further there is a hole extending in the cladding in the longitudinal direction of the fiber. The diameter or the largest measure in a cross section of a longitudinal hole varies, as seen in the longitudinal direction of the fiber, so that several regions of the hole are provided having large diameters or having large dimensions, the dimensions of the hole here being the largest dimension or linear measure in a cross section of the hole, separated by regions having smaller diameters or having smaller dimensions, the dimensions here as above being the largest linear measure in a cross section of the hole. The ratio of the diameters of regions having small diameters and the diameters of regions having large diameters are advantageously comprised within the range of 0.4 and 0.9. The distances between the regions of the longitudinal hole having small diameters can thus like above correspond to at least a few fiber diameters and preferably be at least 0.5 mm and further the regions of the longitudinal hole having small diameters can be essentially periodically located in the longitudinal direction of the fiber.

The diameter of the longitudinal hole can, as seen in the longitudinal direction of the fiber, several times be reduced to zero so that the hole will be closed at several places in the longitudinal direction of the fiber. The diameter or the largest linear measure as seen in a cross section of the hole, at least within areas having the larger diameters, when such areas are provided, should exceed the diameter of the core, in order to influence sufficiently the electromagnetic field of light propagated along the fiber. Further the longitudinal hole should be located at a distance from the core and from an exterior surface of the cladding and these distances can then have at least the same magnitude of order as the core diameter and advantageously be at least 0.25 of the core diameter. The diameter or the largest linear measure in a cross section of the longitudinal hole can for the same reason preferably be comprised within the range of 5 to 50 μm.

In a method for preparing an optical fiber, in particular for use as a sensor, an optical fiber is drawn of a suitably heated preform or original element. The preform contains in the usual way a core region which in the drawing operation will form the core of the fiber and the longitudinal direction of which is parallel to the drawing direction, and further it contains a cladding region surrounding the core region. Before the drawing of the preform a cavity is made outside the core region and essentially in parallel to the longitudinal direction of the core region, this cavity then having a sufficient magnitude so that the fiber after the drawing will still have a longitudinal hole in parallel to the core. During and/or after the drawing of the fiber it is influenced over several, as seen in the longitudinal direction of the fiber, limited regions, for forming regions having a diameter of the longitudinal hole which is reduced compared to the diameter of the holes as directly obtained in the drawing operation. In particular, the limited regions can be influenced so that regions are formed having diameters equal to zero, i.e. closed regions of the fiber are obtained.

Advantageously the fiber can be influenced by heat and the heat can then be obtained from a light beam generated by a laser. Further a substance can be introduced in the cavity of the fiber, this substance being selected so that it changes its volume at variations of physical parameters characteristic of the surrounding in which the fiber is intended to be used. The introduced substance can then be a polymerizable gas or fluid which is influenced over the limited regions to be polymerized there and to form solid narrow regions or plugs only within these influenced regions. Alternatingly with such an introduced first substance, as a variant, a second substance can be introduced in the hole which is different from and has physical/chemical characteristics different from those of the first substance and which is influenced to form the solid narrow regions or the plugs. The second substance can then be introduced in a melted shape and made to cool and solidify to form the narrow regions or the plugs respectively.

DESCRIPTION OF THE DRAWINGS

Specific embodiments of the invention will now be described in detail, these embodiments being described only for illustrative purposes and not intended to limit the scope of the invention, the description being made with reference to the accompanying drawings in which FIG. 1 shows a cross section of an optical fiber suited for sensors, FIGS. 2–4 show cross sections of preforms used in the drawing of the fiber, FIG. 5 shows the combined preform of FIG. 2 as seen from the side, FIG. 6 shows a longitudinal section of an embodiment of the optical fiber of FIG. 1, FIG. 7 shows a longitudinal section of an alternative embodiment of the fiber, FIG. 8 schematically shows an optical fiber used as a sensor, FIG. 9 schematically shows a device for preparing an optical fiber and FIGS. 10 and 11 show longitudinal sections of further embodiments of the fiber.

DESCRIPTION OF PREFERRED EMBODIMENTS

In FIG. 1 a cross section of an optical fiber is shown which is generally referenced 1. The fiber 1 consists of silica glass and has a core 3 and a cladding 5 surrounding the core. The core 3 and the cladding 5 have a generally circular-cylindric shape in the conventional way with concentric cylindric delimitation surfaces and the refractive index of the fiber core is a little larger than that of the cladding 5. Common dimensions can be such as for fibers of type single-mode that the fiber core 3 has a diameter of 6–10μm and the cladding a diameter of 100–200 μm, while for multi-mode fibers a little larger dimensions are common.

In the fiber 1 there is further a longitudinal hole or cavity 7 which is located in the cladding 5 and at some distance from the core 3 and from the exterior surface of the cladding 5. Owing to the hole 7 an asymmetry is created in the mechanical and optical structure of the fiber 1 and this asymmetry can be used for various applications. The longitudinal hole 7 can have different cross sections due to the preparation thereof but in order to be able to generate a sufficiently large mechanical or optical inhomogeneity of the fiber 1 the cross section of the hole should not be too narrow in any direction and it should have a largest dimension or diameter of at least about 1–10 core diameters. Practically this measure of the cavity 7 can be 5–50 μm while its minimum diameter or smallest cross dimension should be at least about 50% thereof.

In FIG. 6 the optical fiber 1 is illustrated as seen in a longitudinal section through the fiber axis. Here the hole 7 is closed at some places 8 in the longitudinal direction of the fiber so that separate or individual cavities 7a are formed. The closed places can have the same or a varying spacing in the longitudinal direction of the fiber. A gas or another substance which is enclosed in the cavities 7a expands or contracts at temperature changes and this will, with a suitable distance between the closed regions 8, for instance of a few fiber diameters such as at least two fiber diameters, or a distance of at least 0.5 mm in practical cases, result in microbends of the fiber 1 in regions adjacent the longitudinal closed places 8 of the original hole 7. These microbends can be detected in a conventional way such as disclosed in the patents cited above.

In FIG. 2 an assembly 10 of preforms is illustrated which is used in preparing the optical fiber 1 according to FIG. 1. In FIG. 2 thus an exterior preform 9 is provided and it has the shape of a cylindrical shell in which an interior preform is arranged. The interior preform 11 is essentially the conventional type used in manufacturing optical fibers suitable for communication. A centrally located, cylindric core region 13 having a little higher refractive index than that of the other parts of the preform assembly 10 is thus located here. In addition, in the interior preform 11 a groove 12 is made which extends along the exterior cylindric surface of the interior preform 11 in the longitudinal direction thereof and further, it extends a distance into the preform 11 without contacting the core region 13. In FIG. 5 part of the corresponding preform assembly 10 is illustrated as seen from the side.

In FIGS. 3 and 4 other possibilities are illustrated for preparing an optical fiber 1 having longitudinal holes located at some distance from the fiber core 3. In FIG. 3 an interior preform 11 of D-type is used which thus principally is comprised of a preform for a conventional communication-type optical fiber which has a core region 13 and for which the cladding has been removed along a flat surface in parallel to the longitudinal direction of the inner fiber element 11 so that the core region 13 is maintained intact. The interior D-preform is surrounded by a cylindric shell 9 as in FIG. 2. A hollow D-shaped space is formed in that way and it will, in and after the drawing of the preform assembly essentially still exist in the prepared fiber and have approximately the same shape but naturally much smaller dimensions.

In the preform assembly of FIG. 4 the cavity having a cross section of a segment of a circle of FIG. 3 has been filled with another D-preform part 17, which has a cross section in the shape of a segment and has a shape which is complementary to the D-preform 15, so that when the two D-preforms are placed with their flat surfaces against each, the exterior surface of the combined preform thus obtained is essentially circular-cylindric. A groove 19 is made centrally in the flat surface of the further interior preform part 17. The interior preforms 15 and 17 are like the structures illustrated in FIG. 2 and 3 surrounded by a preform part 9 having the shape of a cylindrical shell. When drawing the fiber preform assembly of FIG. 4 a solid or integrated optical fiber is obtained having essentially the same shape of its cross section but as above naturally without any discrete parts.

The manufacture of a fiber from the preform assembly 10 of FIG. 2 and 5 will now be described based on the schematic picture in FIG. 9 of a fiber drawing apparatus. The preform assembly is attached with its one upper end to a chuck 31 in the fiber drawing apparatus or the fiber drawing tower from which the fiber having a longitudinal hole is drawn from the other, lower end of the preform assembly 10 which is heated by a high temperature furnace 32. From the element 10 the drawn fiber is drawn, tensioned and wound by means of various pulleys. In particular there are motor driven and/or controlled pulleys 33 and a winding drum 35 comprised in a winding unit 37. The driven and/or controlled pulleys 33 are controlled so that the desired fiber diameter is obtained.

The closed places 8 of the originally longitudinal hole 7 which are illustrated in FIG. 6 can according to one embodiment be accomplished by issuing a sufficiently powerful light beam in the shape of a light pulse from for instance a $CO_2$ laser 39, see FIG. 9, against the fiber whereby the hole 7 is fusioned together in the area which is hit by the laser beam. The activation of the laser 39 and the driving of the pulleys 33 are then controlled by a control circuit 41 which for instance can be adjusted so that the closed places 9 accomplished by the pulsed driving procedure of the laser 33 will be located equidistantly and at suitable distances from each other in the longitudinal direction of the fiber 1 as is illustrated in FIG. 6.

A gas or another desired substance is enclosed in the longitudinal hole of the fiber 1 by being provided to the cavity 12 in the preform assembly 10 from a material container 43 through a pipe 45 connected to the rear end of the element 10 inside the chuck 31 of the drawing tower.

In a special embodiment of the optical fiber plugs are formed in the hole 7 of an introduced other material such as illustrated in FIG. 7 which shows an alternative embodiment. Thus a polymerizable fluid can be introduced in the cavity 7 in the fiber 1, this fluid being made to polymerize only within suitable regions as is indicated at 47 in FIG. 7. The polymerization can for instance be achieved by a local heating or by irradiation with UV-light. The plugs within the areas 47 formed in this way correspond to the closed areas 8 in the embodiment according to FIG. 6 and have corresponding distances from each other as seen in the longitudinal direction of the fiber.

Another possibility of obtaining discrete closed areas 47 as is illustrated in FIG. 7 is to introduce at least two different substances in the cavity 7 so that different segments of the fiber, as seen in the longitudinal direction of the fiber, will contain different substances having different physical and/or chemical properties. Thus for instance the plugs 47 can be formed by introducing a low melting metal in a melted condition in the hole 7 alternatingly with a substance which has desired volume expansion properties at for instance ambient temperature as above.

In an alternative embodiment of the optical fiber 1 which is schematically shown in FIG. 10 there are no particular closed places or more narrow places in the longitudinal hole 7, as seen in the longitudinal direction thereof, but it has an essentially constant diameter over the length of the fiber and it is filled with a substance 49 which has a large volume change, i.e. a large thermal volume expansion coefficient, at a definite temperature or within a limited temperature interval. In the volume change the mechanical properties of the fiber, are changed, for instance stress concentrations may be induced by fiber bendings, what can be detected in the way described above.

In a further alternative embodiment of the optical fiber 1 which is schematically illustrated in a longitudinal section in FIG. 11, the diameter of the longitudinal hole 7 varies in the longitudinal direction of the fiber with a suitable distance between the more narrow regions, like for the closed places as above for instance a few fiber diameters and in particular at least two fiber diameters, or with a least distance of 0.5 mm in practical cases. The variation of the diameters should be considerable for instance with a diameter ratio between 0.4 and 0.9 between narrow regions and wide regions and it can be periodic in the longitudinal direction of the fiber. Owing to the asymmetry of the fiber both in the longitudinal direction and in a radial direction, for an exterior influence of pressure or tensile stress or temperature variations microbends of the fiber core will arise and therewith an increase of the attenuation for suitable light waves which are transferred through the fiber. The hole can be empty or filled with a suitable material as in the embodiment according to FIG. 10 above.

Various combinations of the embodiments of FIG. 6, 7, 10 and 11 are also possible so that the plugs 47 in FIG. 9 for instance only need to form narrow regions in the hole 7.

In FIG. 8 it is schematically illustrated how an optical fiber having a longitudinal hole can be used as a sensor. A segment 8 of the hole fiber is here spliced to an end of a conventional optical communication fiber 83. The other end of the communication fiber 83 is connected to a control and monitoring unit 85. The control and monitoring unit 85 utilizes OTDR (Optical Time Domain Reflectometry) and issues light pulses to the communication fiber 43 and detects the reflected light. If the fiber segment 8 is exposed to certain physical quantities in the surrounding region what accomplishes a varying microbending of the segment, as has been mentioned above, due to the microbending the light which is reflected in the fiber segment 81 is changed. By this effect the variation in the corresponding physical parameter can be detected and also, if a calibration is made, be measured. A segment 81 of a fiber of the type which is principally illustrated in FIGS. 1 and 6 can here be suited as a sensor for e.g. a temperature pressure.

The innermost portion, close to the core 3 of the longitudinal hole 7, does not have to be located too close to the core but can have a distance of for instance 1-5 core diameters from the exterior surface of the core 1. Hereby the longitudinal holes 7 will not disturb the light transmission in the core 3 too much in those portions which are not exposed to any microbends. Further, advantageously the cross section of the cavity 7 can be as large as is practically possible.

We claim:

1. An optical fiber, in particular for use as a sensor, comprising
    a cylindrical core which extends in the longitudinal direction of the fiber and is located centrally in the fiber,
    a cladding which surrounds the core, is connected to the core and has a substantially cylindrical exterior surface, and
    a hole located completely in the cladding and extending in the longitudinal direction of the fiber,
    and a substance which changes its volume for variations of physical parameters characteristic of a region where the fiber is intended to be used,
    the longitudinal hole being completely or partly filled with the substance.

2. An optical fiber according to claim 1, wherein the longitudinal hole is closed at several separate places in the longitudinal direction of the fiber, so that separate cavities are formed.

3. An optical fiber according to claim 2, wherein distances between the closed places in the longitudinal hole correspond to at least two fiber diameters and are at least 0.5 mm.

4. An optical fiber according to claim 2, wherein the closed places in the longitudinal hole are substantially periodically located in the longitudinal direction of the fiber.

5. An optical fiber, in particular for use as a sensor, comprising
    a cylindrical core which extends in the longitudinal direction of the fiber and is located centrally in the fiber,
    a cladding which surrounds the core, is connected to the core and has a substantially cylindrical exterior surface, and
    a hole located completely in the cladding and extending in the longitudinal direction of the fiber,
    wherein the hole has
    several first longitudinal segments and
    second longitudinal segments located between the first longitudinal segments and having smaller diameters or having smaller dimensions as measured linearly in a cross section of the hole than the first longitudinal segments,
    so that the diameter of or the dimension, in a cross section, of the longitudinal hole varies in the longitudinal direction of the fiber.

6. An optical fiber according to claim 5, wherein the ratio of the diameters of the second segments and the diameters of the first segments is in the range between 0.4 and 0.9.

7. An optical fiber according to claims 5, wherein the distances between the second segments of the longitudinal hole correspond to at least a few fiber diameters and are at least 0.5 mm.

8. An optical fiber according to claim 5, wherein the second segments of the longitudinal hole are substantially periodically located in the longitudinal direction of the fiber.

9. An optical fiber according to claim 5, wherein the diameter of the longitudinal hole several times decreases to zero when passing in the longitudinal direction of the fiber so that the hole is closed at several places in the longitudinal direction of the fiber.

10. An optical fiber according to claim 5, wherein the diameter or dimension in a cross section of the fiber, at least within the first segments, when such segments exist, exceeds the diameter of the core.

11. An optical fiber according to claim 7, wherein the longitudinal hole is located at a distance from the core and from an exterior surface of the cladding.

12. An optical fiber according to claim 11, wherein the distances are of at least the same order of magnitude as the core diameter and are at least 0.25 of the core diameter.

13. An optical fiber according to claim 5, wherein the diameter or the dimension in a cross section of the longitudinal hole is within the range of 5 to 50 µm.

14. A method for preparation of an optical fiber, in particular for use as a sensor, comprising the steps of:
    drawing an optical fiber in a drawing direction from a suitably heated preform assembly, where the preform assembly contains
    a core region, which in the drawing forms the core of the fiber and has a longitudinal direction, this longitudinal direction being parallel to the drawing direction, and further contains
    a cladding region surrounding the core region,
    making before the drawing, a cavity in the preform assembly outside the core region and substantially in parallel to the longitudinal direction of the core region,
    so that after the drawing operation an optical fiber is obtained having
    an elongated core formed from the core region and having a longitudinal direction,
    a cladding formed from the cladding region and located around the core, and
    a cavity located completely in the cladding extending along and essentially in parallel to the core, wherein
    during and/or after the drawing of the preform assembly to form the fiber, the fiber is influenced over several regions which are limited in the longitudinal direction of the fiber for forming segments having a smaller diameter or a smaller cross-sectional dimension of the cavity than that of non-influenced segments of the fiber.

15. A method according to claim 14, wherein the limited segments are influenced so that the segments are formed having a diameter equal to zero, thereby obtaining closed segments of the cavity.

16. A method according to claim 14, wherein the fiber is influenced by heat.

17. A method according to claim 16, wherein the heat is obtained from a light beam generated by a laser.

18. A method according to claims 14, wherein in the cavity of the fiber a substance is introduced which changes its volume at variations of physical parameters or quantities characteristic of the surrounding region in which the fiber is intended to be used.

19. A method according to claim 18, wherein the introduced substance is a polymerizable gas or fluid which over the limited segments is influenced in order to be polymerized and form solid narrow segments or plugs only within the influenced segments.

20. A method according to claim 18, wherein alternately with the substance in the cavity a second substance is introduced, which is influenced in order to form solid narrow places.

21. A method according to claim 20, wherein the second substance is introduced in a melted shape and is caused to cool and solidify to form the narrow places.

* * * * *